# (12) United States Patent
Tengman

(10) Patent No.: US 10,322,823 B2
(45) Date of Patent: Jun. 18, 2019

(54) EXTERNAL SYSTEMS FOR AIRCRAFT CLIMATE CONTROL

(71) Applicant: Smart Climate Scandinavian AB, Umeå (SE)

(72) Inventor: Anders Tengman, Umeå (SE)

(*) Notice: Subject to any disclaimer, the term of this patent is extended or adjusted under 35 U.S.C. 154(b) by 234 days.

(21) Appl. No.: 14/761,406

(22) PCT Filed: Mar. 13, 2014

(86) PCT No.: PCT/SE2014/000026
§ 371 (c)(1),
(2) Date: Jul. 16, 2015

(87) PCT Pub. No.: WO2014/142727
PCT Pub. Date: Sep. 18, 2014

(65) Prior Publication Data
US 2016/0001895 A1    Jan. 7, 2016

(30) Foreign Application Priority Data

Mar. 13, 2013 (SE) .................................. 1300194

(51) Int. Cl.
*B64F 1/36* (2017.01)
*B64D 13/06* (2006.01)
*B64F 1/305* (2006.01)

(52) U.S. Cl.
CPC .............. *B64F 1/364* (2013.01); *B64F 1/305* (2013.01); *B64F 1/362* (2013.01); *B64D 2013/0618* (2013.01); *Y02T 50/56* (2013.01)

(58) Field of Classification Search
CPC .......... B64F 1/364; B64F 1/305; B64F 1/362; B64D 2013/0618

USPC ................................................. 165/202, 203
See application file for complete search history.

(56) References Cited

U.S. PATENT DOCUMENTS

| | | | | |
|---|---|---|---|---|
| 2,240,377 A * | 4/1941 | Preble | ................ | B61D 27/0081 62/237 |
| 2,257,221 A * | 9/1941 | Bell | ........................ | A23L 3/363 454/119 |
| 2,293,316 A * | 8/1942 | Stebbins | ............ | B61D 27/0081 160/327 |
| 2,303,867 A * | 12/1942 | Stebbins | ............ | B61D 27/0081 34/433 |
| 2,439,487 A * | 4/1948 | Reilly | ................ | B61D 27/0027 165/42 |
| 2,538,382 A * | 1/1951 | Reilly | ................ | B61D 27/0027 454/119 |
| 2,737,780 A * | 3/1956 | Curell, Jr. | ............... | B64F 1/364 280/47.19 |

(Continued)

FOREIGN PATENT DOCUMENTS

DE          29622089 U1    4/1998
WO    WO2007097668 A1    8/2007

*Primary Examiner* — Ljiljana V. Ciric

(57) ABSTRACT

A climate control system is intended to be temporarily connected externally to an aircraft when the aircraft is on the ground. The system directs air through flexible conduits from an external independent air handling unit to the aircraft. The system may include a transfer device with which the air handling device may be moved in relation to the aircraft. The transfer device may be an element of a telescopic boarding bridge. The system includes systems for conveying heated or cooled fluid from a distant source to the air handling unit.

3 Claims, 7 Drawing Sheets

(56) References Cited

U.S. PATENT DOCUMENTS

| | | | | |
|---|---|---|---|---|
| 2,778,206 A * | 1/1957 | Wilson | B61D 27/0027 | 62/237 |
| 3,777,506 A * | 12/1973 | Hergatt | B60H 1/00264 | 62/237 |
| 4,251,994 A * | 2/1981 | Reinhorn | F24F 5/0085 | 62/237 |
| 4,272,967 A * | 6/1981 | White | B64F 1/364 | 62/236 |
| 4,620,339 A | 11/1986 | Shepheard | | |
| 4,632,019 A | 12/1986 | Whiteman | | |
| 4,835,977 A | 6/1989 | Haglund | | |
| 4,872,320 A * | 10/1989 | Ishizaka | A47F 3/0408 | 62/237 |
| 4,901,538 A * | 2/1990 | Anthony | B64D 9/00 | 454/77 |
| 4,923,237 A * | 5/1990 | Kiefer | B60P 1/64 | 296/208 |
| 4,934,255 A * | 6/1990 | McDonnell | B60P 3/20 | 236/44 C |
| 4,943,204 A * | 7/1990 | Ehrlich | B60P 1/02 | 187/211 |
| 5,031,690 A * | 7/1991 | Anderson | B60H 1/3226 | 165/43 |
| 5,121,739 A * | 6/1992 | Barker | F02N 19/02 | 123/142.5 R |
| 5,383,335 A * | 1/1995 | Anderson | B64F 1/362 | 62/237 |
| 5,564,287 A * | 10/1996 | Hearne, Jr. | B61D 27/0081 | 62/237 |
| 5,924,744 A * | 7/1999 | Eberle | F16L 37/20 | 285/179 |
| 5,931,012 A * | 8/1999 | Robertson | B60H 1/00257 | 248/419 |
| 6,148,630 A * | 11/2000 | Saccone | F24F 1/027 | 62/259.1 |
| 6,167,714 B1 * | 1/2001 | Baffes | F24F 1/025 | 62/188 |
| 6,343,483 B1 * | 2/2002 | Armstrong | A47F 3/0408 | 62/255 |
| 6,405,549 B1 * | 6/2002 | Baffes | F24F 1/025 | 62/188 |
| 6,418,744 B1 * | 7/2002 | Neal | B64F 1/364 | 62/239 |
| 6,424,891 B1 * | 7/2002 | Sargent | B64F 1/34 | 701/33.2 |
| 6,482,080 B2 * | 11/2002 | Wilson | B60H 1/00257 | 454/119 |
| 6,571,574 B1 * | 6/2003 | Blackstone | F24F 5/0017 | 62/420 |
| 6,746,323 B1 * | 6/2004 | Digby, Jr. | B60H 1/00378 | 454/119 |
| 7,122,065 B2 * | 10/2006 | Fox | G01N 1/24 | 55/306 |
| 7,159,475 B2 * | 1/2007 | Casillas | G01N 1/22 | 73/864.34 |
| 7,322,203 B2 * | 1/2008 | Widegren | B64F 1/364 | 62/172 |
| 7,412,840 B2 * | 8/2008 | Leathers | B64F 1/364 | 62/208 |
| 7,685,838 B2 * | 3/2010 | Hutton | B64F 1/364 | 62/430 |
| 7,814,764 B1 * | 10/2010 | Heater | F24F 1/04 | 62/476 |
| 8,047,555 B2 * | 11/2011 | Mann, III | B64F 1/364 | 280/79.11 |
| 8,117,864 B2 * | 2/2012 | Montminy | B64F 1/364 | 62/419 |
| 8,424,330 B2 * | 4/2013 | Gill | B60H 1/00264 | 62/237 |
| 9,016,087 B2 * | 4/2015 | Urbain | B64F 1/364 | 62/239 |
| 2004/0040326 A1 * | 3/2004 | Hunt | F25B 9/004 | 62/236 |
| 2004/0231187 A1 * | 11/2004 | Moretto | F26B 21/083 | 34/576 |
| 2005/0247316 A1 * | 11/2005 | Orr | A61M 16/0045 | 128/205.12 |
| 2007/0089411 A1 * | 4/2007 | Leistner | B64F 1/34 | 60/599 |
| 2007/0235587 A1 * | 10/2007 | Delort | B64F 1/364 | 244/114 R |
| 2008/0185064 A1 * | 8/2008 | Kolzumi | F16L 11/088 | 138/126 |
| 2008/0223403 A1 * | 9/2008 | Ford | B08B 15/00 | 134/8 |
| 2008/0250803 A1 | 10/2008 | Leadingham | | |
| 2009/0084120 A1 * | 4/2009 | Meier | B64F 1/362 | 62/129 |
| 2009/0107159 A1 * | 4/2009 | Mann, III | B64F 1/364 | 62/239 |
| 2009/0108549 A1 * | 4/2009 | Montminy | B64F 1/364 | 280/47.34 |
| 2009/0124963 A1 * | 5/2009 | Hogard | A61M 1/16 | 604/30 |
| 2010/0031676 A1 * | 2/2010 | Urbain | B64F 1/364 | 62/89 |
| 2010/0212768 A1 * | 8/2010 | Resendes | F16L 11/02 | 138/116 |
| 2010/0307178 A1 | 12/2010 | Hansen | | |
| 2011/0030414 A1 * | 2/2011 | Newell | B64F 1/364 | 62/426 |
| 2011/0042939 A1 * | 2/2011 | Mustar | F16L 27/0828 | 285/148.15 |
| 2011/0113801 A1 * | 5/2011 | Rajasekaran | B64F 1/364 | 62/186 |
| 2011/0177771 A1 * | 7/2011 | Kelnhofer | B64D 13/00 | 454/76 |
| 2011/0284201 A1 * | 11/2011 | Soenmez | B64F 1/364 | 165/287 |
| 2012/0064816 A1 * | 3/2012 | Krakowski | B64D 13/00 | 454/76 |
| 2012/0067965 A1 | 3/2012 | Rajasekaran | | |
| 2012/0151933 A1 * | 6/2012 | Ouplomb | B64D 41/00 | 60/772 |
| 2013/0061975 A1 * | 3/2013 | Leadingham | F16L 59/153 | 138/149 |
| 2014/0102125 A1 * | 4/2014 | Tinde | B64F 1/362 | 62/237 |

\* cited by examiner

EXTERNAL SYSTEMS FOR AIRCRAFT CLIMATE CONTROL

FIELD OF THE INVENTION

The present invention concerns a variant of a climate control system for aircraft and the like in accordance with the claims.

BACKGROUND OF THE INVENTION

Flying has in today's society become a common way to travel quickly between different locations. Air travel and air transport give rise to many great possibilities but also give rise to a number of problems. One of the problems associated with air travel is that the air in the aircraft's cabin compartments is cooled or heated between flights in conjunction with the aircraft, for a shorter or longer period of time, being parked waiting for the next flight. A need to heat or cool the cabin air is usually present, especially during a long period of parking. The need to heat or cool the cabin air varies with the climate, temperature, where the plane is parked. In particularly hot or cold outside temperatures, the problems become challenging. In particularly hot or cold climate conditions, problems with cabin air temperature may become considerable and in the worst case health endangering for passengers.

One problem with cooling or heating the air in an aircraft cabin is that the aircraft's engines usually have to be running in order to obtain a satisfactory climate in the aircraft. Keeping the engines running for a long time before flight departure causes increases in fuel costs and an increased burden on the environment.

Because of the fact that flight (air travel) has a negative environmental impact, there is an ambition to reduce the impact that flight along with its accompanying facilities entail. One of the greatest environmental problems associated with flight are the emissions from the aircraft's burned fuel. Furthermore it has become all more important to operate all equipment associated with flight in a more environmentally friendly manner. It is therefore an ambition of airports to utilize energy from alternative energy sources to power the necessary accompanying equipment such as for example climate smart air conditioning systems and other systems with energy sources that allow for a reduction in environmental impact more than existing energy sources do.

Another problem associated with aircraft parked on the ground is corrosion caused by moisture in the air. This problem is especially problematic in aircraft which have been parked on the ground for a longer period of time.

Another problem with existing designs of climate control systems for aircraft is that they are usually placed on the ground, for example on a wagon (cart) or another type of vehicle. The placement of a climate control system on a wagon on the ground causes a risk of the wagon being in the way for vehicles and employees performing work related tasks in proximity of the parked aircraft. A considerable amount of work is involved to move these wagons from one position to another. There are also problems with the climate control system's hoses, cords and the like that during use lie on the ground. For example conduits, hoses and cords may cause hindrances for vehicles and personnel and even increase the risk of injuries.

One problem with existing designs is that they essentially only may be used for one application where each product is adapted to the specific application. Thus, these are intended to be used on the wagon or stored and not for both applications.

Another problem in conjunction with embarking and debarking aircraft is climate control in interior spaces in the so called "boarding bridges" and the like. It is difficult to heat and cool existing designs of boarding bridges in an efficient manner.

Another problem in proximity to aircraft parked on the ground is to achieve an efficient melting of snow (ice) around and under the parked aircraft. Currently, electrically powered systems are for example utilized for snow melting, creating the need for more cost efficient types of snow melting.

One problem with existing designs of air conditioning systems for aircraft is that they cool air down to below freezing temperatures such as down to −25 degrees C. and in extreme cases down to −40 degrees C. This in turn may create the need for defrosting in order to remove frost build-up and the like caused by the extremely cold air.

Another problem with existing systems is that they are powered by electricity. Presently, there is a significant need within the flight (air travel) industry, in as great an extent as possible, to chose more environment friendly alternatives than that which is currently used.

PRIOR ART

Several different variants of equipment (apparatuses, systems) for heating and/or cooling the cabins and similar of aircraft parked on the ground are previously known. For example, U.S. Pat. No. 4,632,019 describes a system for cooling an aircraft's cabin when the plane is parked on the ground. Its design differs significantly from the present invention. The design is for example, according to its description, not intended to be powered (operated) by district heating and/or district cooling. Furthermore, the system is only intended to cool air that is supplied to the aircraft's cabin.

RE32687 describes a variant of a climate control system for aircraft which according to its description includes the supply of both cooled and heated fluid to the climate control system. The outgoing and ingoing (return) conduits (lines) for the heated or cooled fluid differs significantly from the present invention's design. For example, the design of the outgoing and ingoing conduits is problematic in regards to a winter climate. Further, the climate control system is located on the roof of the structure causing problems with accessibility, for example in connection with repair, inspection, and the like.

Even EP 1951573 discloses a system for supplying electricity to aircraft and to cool the air in an aircraft's cabin. This design differs to a significant extent from the present invention. For example, the design according to its description is not intended to be powered by district heating and district cooling.

U.S. Pat. No. 7,651,052 discloses an assembly for supplying electricity and air to aircraft. The system is intended to be used to cool the air in the cabin of the aircraft. This design differs from the present invention. For example, the design according to its description is not intended to be powered by district heating and district cooling.

U.S. Pat. No. 6,637,215 discloses a system and method for cooling cabin air in aircraft. The design differs from the present invention's design. For example, the design according to its description is not intended to be powered by district heating and district cooling.

Even EP1951573B1 discloses a variant of a system for cooling cabin air in aircraft. This design differs from the present invention's design. For example, the design according to its description is not intended to be powered by district heating and district cooling.

U.S. Pat. No. 3,399,545 discloses a variant of an air conditioning system for aircraft. This design according to its description differs significantly from the design according to the present patent application. For example, the design according to its description gives rise to higher energy consumption than the present invention. The length of the conduit for air causes both heating and ventilation losses for the system.

A prototype of a simpler version of a climate control system has been developed and tested at Helsingborg/Ängelholm Airport. This design, however, differs to a significant extent from the design according to the present patent application.

Purpose of the Present Invention

The main purpose of the present invention is to create a climate control system which solves or reduces at least one of the above mentioned problems. Another purpose of the present invention is to create a climate control system with which air in an aircraft cabin may be heated, cooled and dehumidified. A further purpose of the present invention is to create a climate control system that utilizes district heating to warm air that is supplied to the aircraft. Yet another purpose of the present invention is to create a climate control system that cools the aircraft's supplied cool air with district cooling. A still further purpose of the present invention is to create a climate control system which may be placed on the airport's boarding bridge. In alternative embodiments, a further purpose of the present invention is to create a climate control system which may be utilized to warm or cool spaces in the boarding bridge or similar. In alternative embodiments it is conceivable that the present invention is utilized to warm at least one other space, object or similar such as the ground in proximity (around) to the parked aircraft's position. In alternative embodiments, a still further purpose of the present invention is to create a system that is comprised of modules. At least one of the above named purposes is achieved with a climate control system in accordance with the claims.

BRIEF DESCRIPTION OF THE DRAWINGS

In the following detailed description of the present invention, reference and references to the following figures will occur. Each of these figures is briefly described in the following figure list. The exemplifying embodiments in the figures are not limiting for the scope of protection of the present patent application. Note that the figures are schematic and details may thus be omitted in these.

DETAILED DESCRIPTION OF THE PRESENT INVENTION

Figure 1:
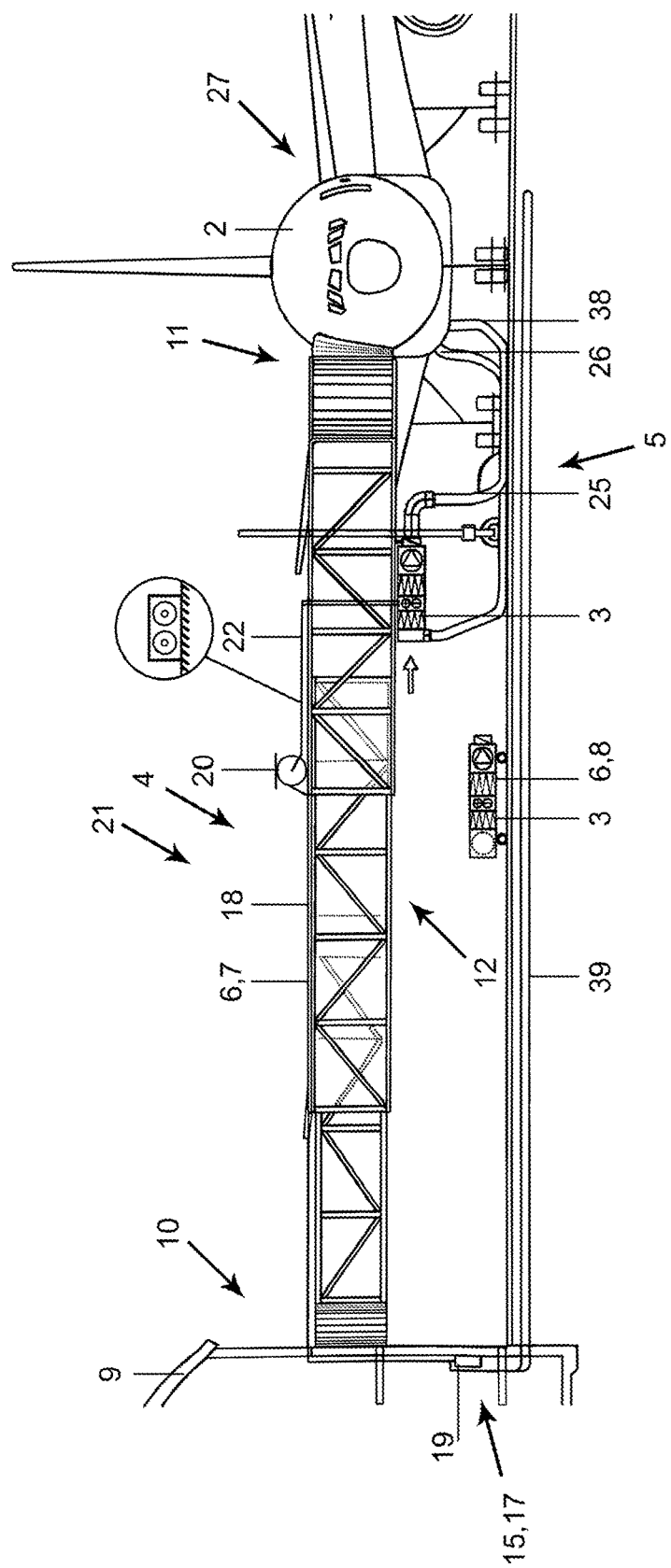
FIG. 1 shows the present climate control system as attached to a boarding bridge

With reference to the figures, a climate control system 1 is shown that is for example intended to supply heated or cooled air to at least one aircraft 2 standing on the ground in accordance with the present patent application.

The climate control system 1 is comprised of at least one air handling unit 3 with which the supplied air to the aircraft is heated (warmed) or cooled. The climate control system 1 is further comprised of at least one subsystem 4 for supplying heated or cooled liquid to the air handling unit 3. The climate control system 1 is further comprised of at least one subsystem 5 for the transfer of heated or cooled air from the air handling unit 3 to the aircraft's 2 cabin. Subsystem 5 may also include a function for returning air from the aircraft's cabin to the climate control system with the intent to recover energy.

Referring to FIG. 1, an air handling unit 3 is shown which is placed on a transfer device 6 with which the air handling unit 3 may be moved relative to the aircraft 2. In FIG. 1 the transfer device 6 consists of at least one boarding bridge 7 or similar type of structure. In alternative embodiments, as shown in FIG. 4A-4D, the transfer device 6 is comprised of another for the purpose suitable transfer device such as for example a vehicle 8, wagon (carriage, cart) or similar.

Referring to FIG. 1, it is shown in more detail how the transfer device 6 is comprised of a "boarding bridge" (causeway, ramp) 7 or similar structure adjacent to a building 9 (such as an airport terminal building). The design of the boarding bridge 7 may vary within the scope of present patent application. The one end 10 of the boarding bridge is however preferably pivotally connected to the building 9. The second end 11 of the boarding bridge 7 is intended to be connected to the aircraft. The length of the boarding bridge 7 may preferably be operated so that it may be shortened or extended. The shortening or extension of the boarding bridge 7 may be accomplished telescopically or with another for the purpose suitable technique. In alternative embodiments it is conceivable that the length of the boarding bridge is not adjustable.

In the exemplifying embodiment, the air handling unit 3 is connected to the underside 12 of the boarding bridge 7. Preferably, the air handling unit 3 is connected so close as possible to the second end 11, the free end, of the boarding bridge 7. The connection of the air handling unit to the underside 12 of the boarding bridge 7 is accomplished with previously known technology, and this is why it is not described in more detail in this patent application. With the placement of the air handling unit 3 so close to the second end 11 of the boarding bridge 7 as possible, losses in the subsystem 5, for the transfer of the heated or cooled air from the air handling unit 3 to the aircraft's 2 cabin, are reduced. In alternative embodiments it is conceivable that the air handling unit 3 is connected to the boarding bridge 7 at another for the purpose suitable position. By moving the boarding bridge 7 in relation to the aircraft and the building, the air handling unit 3 may move relative to the aircraft 2 and the building 9.

Referring again to FIG. 1, it is shown that the climate control system 1 includes at least one subsystem 4 for supplying relatively hot liquid, or relatively cold liquid which is used to heat and cool the air in the air handling unit.

The input of relatively hot fluid or relatively cold fluid into the air handling unit 3 may be accomplished in several different ways and with different techniques. In the preferred embodiment shown in FIG. 2, this is accomplished with at least one separate closed circuit 13 which via at least one first heat exchanger 14 is connected to at least one district heating network 15 and at least one second heat exchanger 16 is connected to a network 17 for district cooling.

Connection is accomplished via at least one flexible conduit (hose, tube) 18 or the like. The flexible conduit 18 includes at least one conduit for supplying fluid to the air handling unit 3 and at least one conduit for the return of fluid from the air handling unit. In alternative embodiments, the supply of fluid to, and respectively the return of flquid from the air handling unit 3 may be accomplished via separate flexible conduits or the like. The connection of the flexible conduit, or conduits, to the network for district heating 15 and district cooling 17 is accomplished via at least one connection point 19, or several connection points 19. The connection point's 19 position, or the connection points' positions may vary greatly within the scope of the invention.

The subsystem 4 for supplying heated or cooled fluid to the air handling unit 3 is comprised of at least one reeling device 20 onto which the flexible conduit(s) 18 is rolled up on and unrolled from. During an extension of the boarding bridge 7, the flexible conduit 18 is rolled off from the reeling device 20 and during a retraction of the boarding bridge 7, the flexible conduit 18 is rolled onto the reeling device. The reeling device 20 is preferably connected to the top side 21 of the boarding bridge 7. The flexible conduit is in the preferred embodiment preferably not insulated thereby allowing any snow and ice on it to melt during winter climate conditions. Thanks to the flexible conduit not being insulated, the function of the reeling device is guaranteed during winter climate conditions. This in turn does not exclude the flexible conduit in alternate embodiments from being insulated.

In alternative embodiments, the reeling device 20 may be connected to a different location on the boarding bridge. Further, alternative embodiments of the climate control system may include at least one first reeling device 20 and at least one second reeling device 20. The use of at least two reeling devices permits the use of the system on relatively longer boarding bridges. The reeling device 20 is preferably of a spring-loaded type. Preferably, the flexible conduit or the like is connected to the building via at least one strain relief or the like.

Between the reeling device 20 and the air handling unit 3, cooled or heated fluid is conveyed through at least one conduit (tube, hose) 22, or similar connection.

Figure 2:
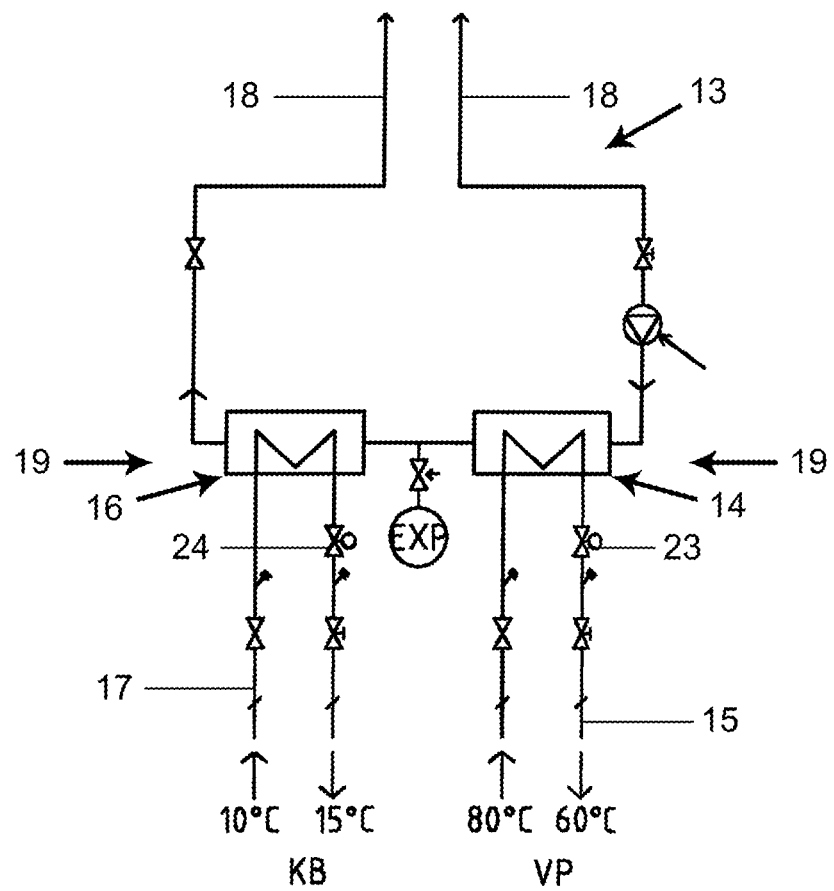
FIG. 2 shows a connection to a district heating network and/or a network for district cooling.

Referring to FIG. 2 is shown in a flow chart, an exemplifying embodiment of the connection of the supply system 4 to a network for district heating and district cooling. The system is, in the preferred embodiment, comprised of at least one first shunt (bypass) valve 23 and one second shunt valve 24. Shunt valve 23 controls the transfer of fluid from the district heating network to the first heat exchanger and shunt valve 24 controls the transfer of fluid from the network for district cooling to the second heat exchanger.

Transfer of the heated or cooled air from the climate control system 3 to the aircraft's 2 cabin is accomplished via at least one air supply duct 25. The air supply duct is preferably of a flexible type which is suitable for the purpose. The length of the flexible duct may vary within the scope of the present patent application.

The flexible duct 25 may be connected in a variety of ways to the aircraft's cabin. In a preferred embodiment of the present patent application, the air supply duct 25, or, in appropriate cases, ducts are connected to one or more of the aircraft's air intake connectors (adapters) 26. The connection to the connector 26 has the advantage that it consists of an existing connection to the aircraft cabin.

The airflow to the aircraft cabin causes the air in the cabin to gradually be replaced and preferably vented out via the aircraft's air ventilation device 27. By way of this method, the air's temperature in the cabin may be raised or lowered depending on whether heated or cooled air is supplied to the cabin. Furthermore a reduction of air humidity in the cabin is accomplished (caused by the air supplied to the cabin at an earlier stage being dehumidified in the air handling unit).

Figure 3:
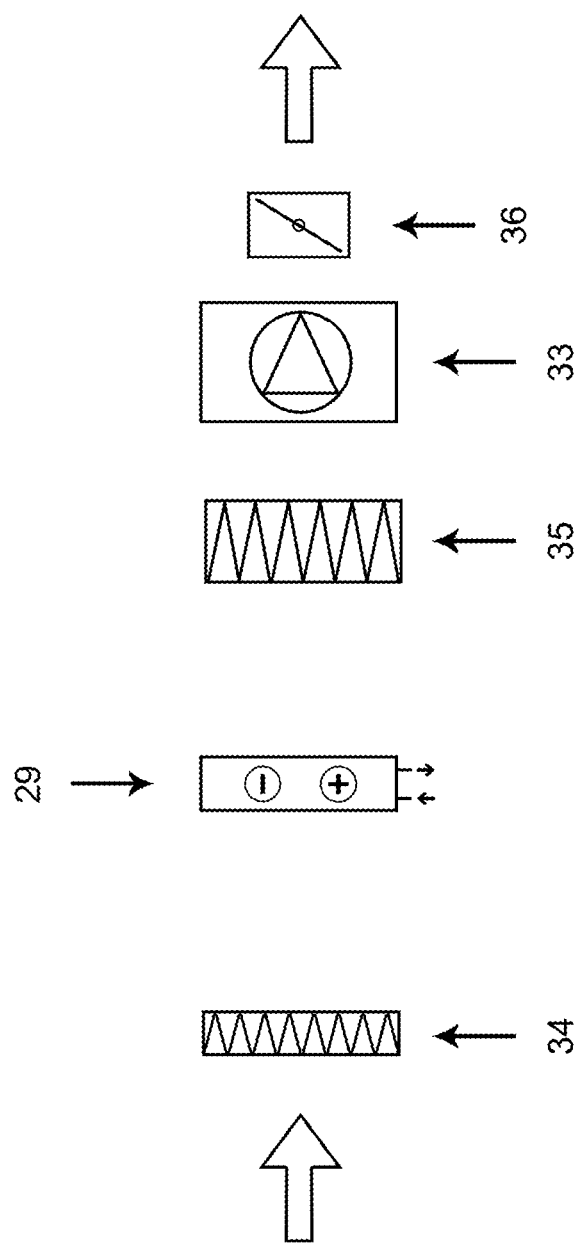
FIG. 3 shows schematically an exemplifying embodiment of the climate control system's function.

Referring to FIG. 3, it is shown how the air handling unit 3 includes at least one device 28 with which the delivered air temperature to the cabin may be raised. The device therefore is comprised at least one heating package 29 with which the air's temperature may be increased. The present climate control system 1 also preferably includes a second device 30 with which the air to be brought into the aircraft's cabin may be cooled (dehumidified) with. The air handling unit 3 is therefore comprised of at least one cooling package 31 with which the temperature of the air supplied to the cabin may be lowered. In the preferred embodiment of the present climate control system 1, the heating package 29 and the cooling package 31 may be integrated in a combined heating and cooling package 32. By way of this combined heating and cooling package, the aircraft cabin may be both cooled and heated by the climate control system.

Referring to FIG. 3, it is shown schematically how the treatment of the air in the climate control system is accomplished in an exemplifying embodiment. The air flow in the climate control system is created by at least one fan 33 or the like. The raw air is introduced into the climate control system to at least one first fine filter 34 after which the air is conveyed to the combined heating and cooling package (heating/cooling coil) 32. After the air passes the combined heating and cooling package 32, the air, in the exemplifying embodiment, is conveyed on to the at least one filter 35. This filter is preferably comprised of at least one electrostatic filter. In alternative embodiments, the design may exclude filter 35 or this filter may be comprised of at least one carbon filter. The use of an electrostatic filter has a number of advantages. An electrostatic filter has for example the advantage of being relatively smaller than a carbon filter and has a lower pressure drop than a carbon filter. An electrostatic filter also has the advantage that it does not, in a similar way as a carbon filter, regularly need replacing.

The filter 35 is used for example to remove odors from exhaust fumes, aircraft fuel, (possibly toxins) cooking odors and more so that the cabin air introduced is essentially odorless. In the exemplary embodiment, the design also includes at least one fire damper 36 which prevents the spread of an eventual fire at or in the system. After the fire damper 36 the handled air is supplied to the aircraft cabin via at least one conduit, connected to the aircraft's air intake or in another way connected via a suitable for the purpose connection or connector to the aircraft's cabin.

In alternative embodiments, it is further conceivable that the design includes at least one device for ionization.

In an alternative embodiment of the present system, air removed from the cabin is returned to the air handling unit via at least one air exhaust duct 38. Preferably, the air exhaust duct 38 is comprised of a flexible duct. The length of the flexible air exhaust duct 38 may vary within the scope of the present patent application.

In an alternative embodiment, the return air from the aircraft cabin is conveyed via at least one of the aircraft's doors into the inner space of a boarding bridge, which is connected to the aircraft. By conveying the return air out through the door, or doors, resistance to vent out the air from the cabin of the aircraft is reduced. On at least one position along the boarding bridge's length is found at least one opening through which exhaust air from the space inside the boarding bridge is conveyed by at least one exhaust duct 38 to the climate control system.

In the air handling unit, air from the cabin, in whole or in part as supplied air (intake air) to the air handling unit is recycled. In alternative embodiments it is conceivable that a heat exchange of the exhaust air takes place with the intention of recovering energy from the exhaust air. A substantial energy saving occurs if, for example, relatively warmer air, as for example +16 degree C. air, is recycled from the cabin and heated again and returned to the cabin of the aircraft. This compares with cold air, for example −20 degrees C. being supplied directly into the aircraft. The proportion of air that is recycled may vary. For example, two-thirds of the air removed from the aircraft cabin by the exhaust duct 38 may be recycled.

In alternative embodiments it is conceivable that at least one sensor senses the temperature inside the cabin of the aircraft. The sensor transmits data/information about the temperature in the cabin, and possibly other parameters, to the climate control system's control system. Upon transmission of information by wire, the sensor with associated connectors may, for example, be connected to the aircraft cabin via air ventilation device or similar. The transmission of data or information from the sensor to the control system may also be accomplished in a wireless manner.

In alternative embodiments it is conceivable that the fluid in the return line from the climate control system be used to heat, or cool, the inner space of a boarding bridge. In warm climates the inner space of the boarding bridge is cooled. In cold climates the air in the inner space of the boarding bridge is heated. This is, for example, accomplished by at least one separate duct from the climate control system being connected to the boarding bridge.

In further embodiments of the present invention, the return fluid from the climate control system is used to heat the surface of the ground (snow melting) adjacent the boarding bridge and/or the ground adjacent the position of the parked aircraft. This is done, for example, by the return fluid from the air handling unit being used in at least one ground loop 39 for snow melting.

Figure 4A:
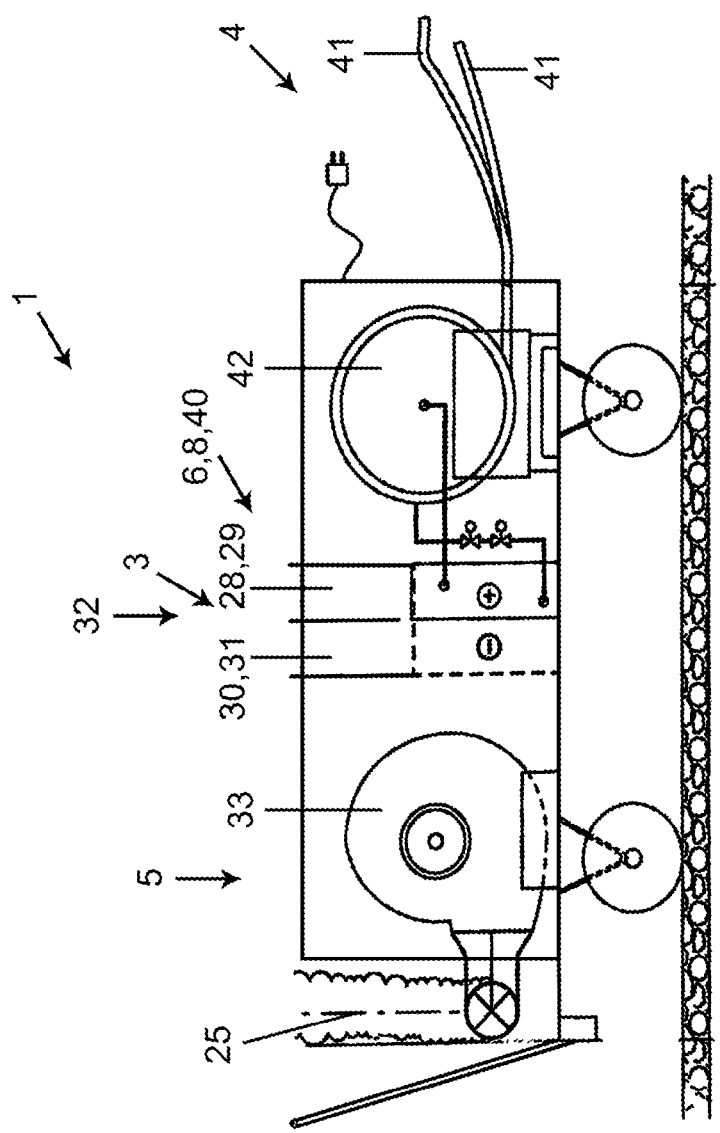
FIG. 4A-D show an alternate embodiment of the present invention.
Figure 4B:
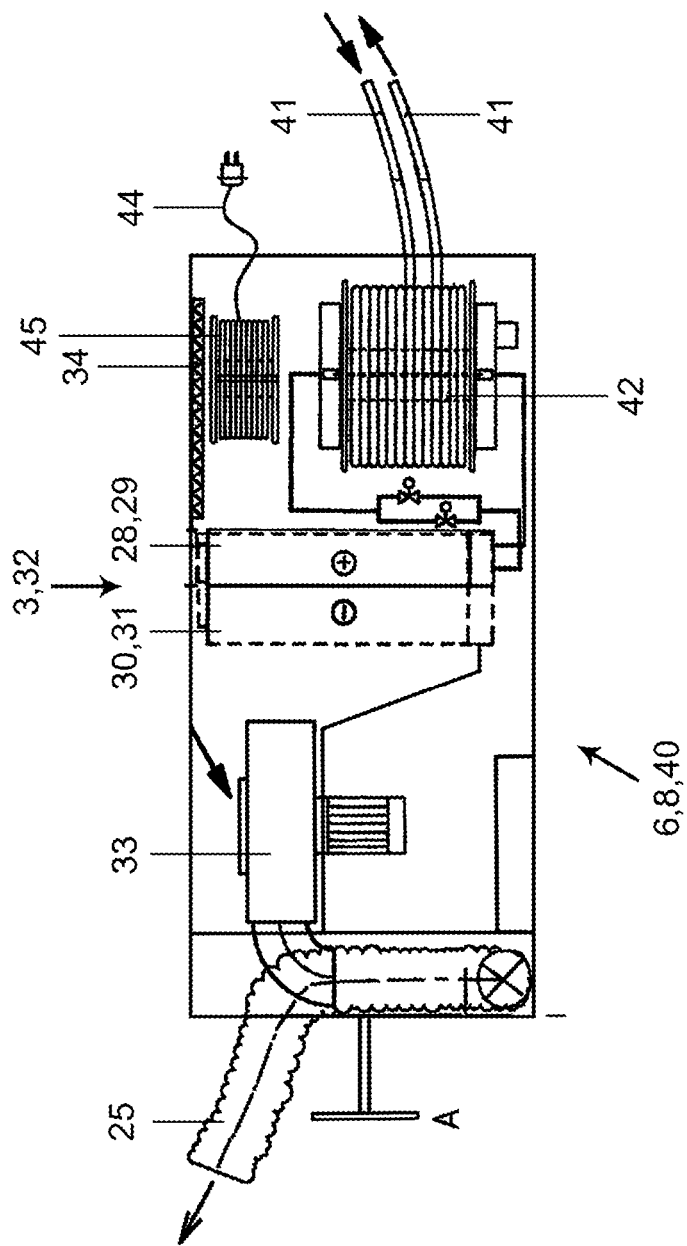
Figure 4C:
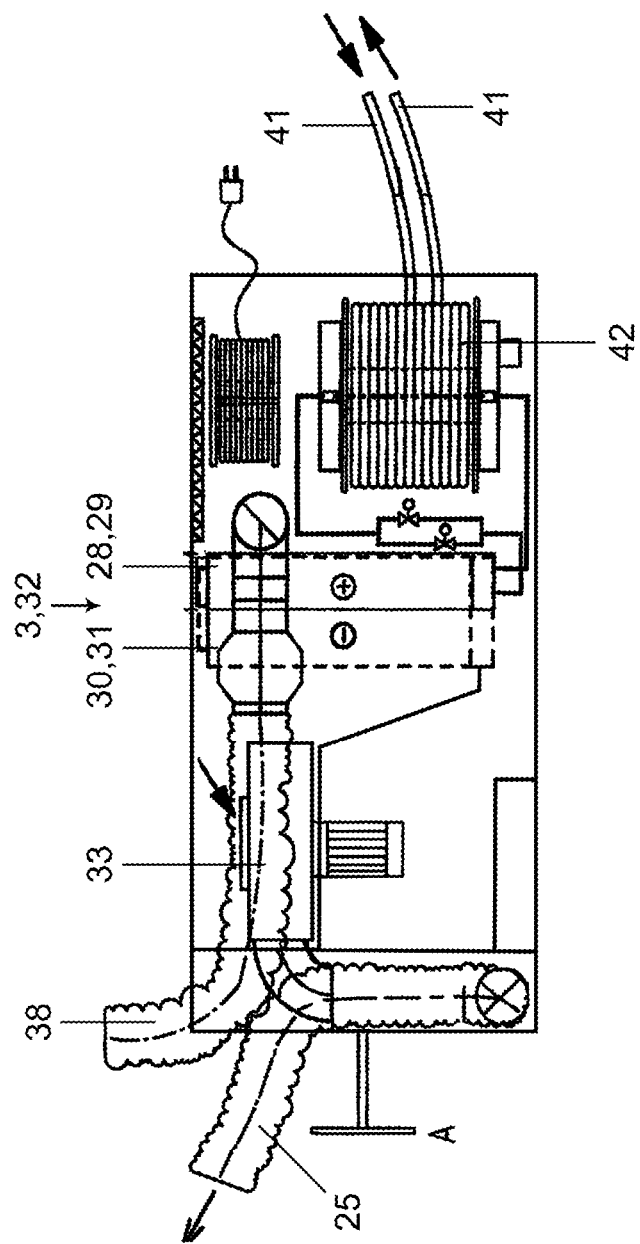
Figure 4D:
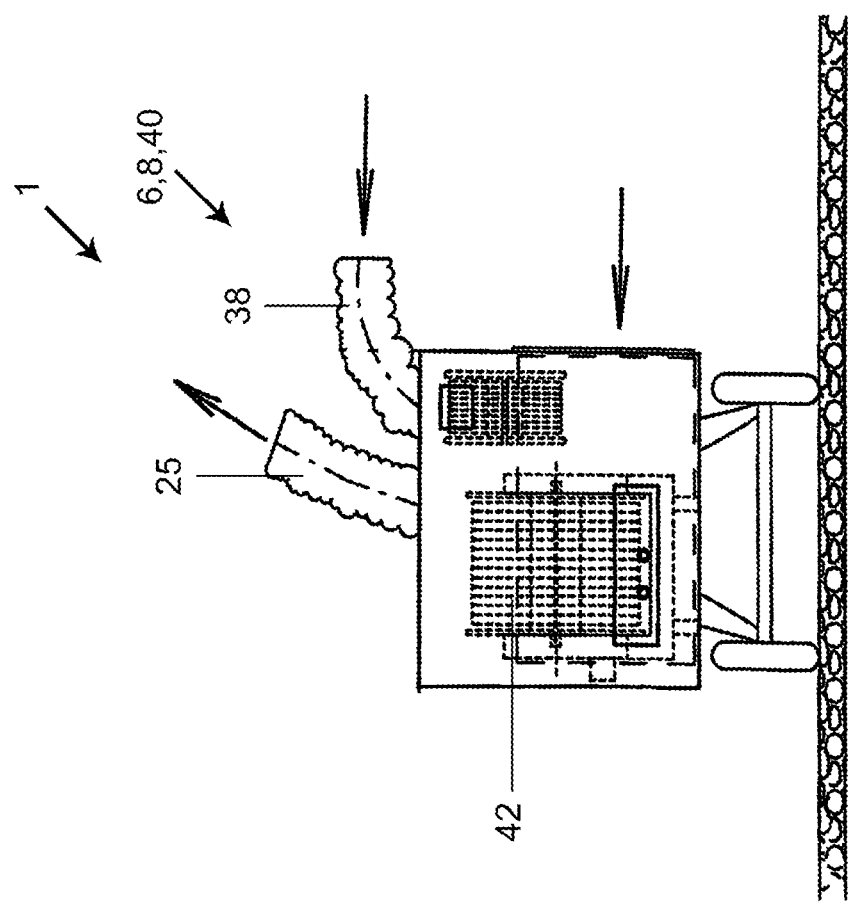

With reference to FIG. 4A to 4D, an alternative embodiment of the transfer device 6 where it consists of a vehicle 8 or the like is shown. FIGS. 4A and 4B show a climate control system intended to supply heated or cooled air to at least one cabin in at least one aircraft. FIGS. 4C and 4D show a climate control system intended to supply heated or cooled air to at least one cabin in at least one aircraft and at least one return line for recycling a portion of the energy in the air from the cabin.

The vehicle 8 may be equipped with its own drive unit but may also consist of a cart (carriage, wagon) 40 or vehicle which is operated with an external drive unit or manually moved. The cart's 40 design may vary greatly within the scope of the present patent application. Connection to the district heating network and the network for district cooling is preferably accomplished via one or more flexible conduits 41. The flexible conduits 41 which are connected to the district heating system and the system for district cooling, are preferably rolled up on at least one reeling device 42 such as is shown in the figures. In alternative embodiments, it is conceivable that the conduit is stored in another manner in at least one storage compartment in the climate control system when the conduit is not in use. In alternative embodiments, the storage of the conduit when it is not in use may be accomplished in another suitable way, for example, the conduit may be stored externally in relation to the climate control system.

Preferably one or more quick couplers (connectors) 43 for connecting the connecting flexible conduits to the district heating system or network for district cooling is used. The quick coupler 43 includes at least one check valve of a type which provides minimal leakage or substantially no leakage at all. For example, a valve, marketed under the trademark Drylok may preferably be used as a quick coupling for connecting conduits to the district heating system. In alternative embodiments, other suitable for the purpose connectors may be used to connect the flexible conduits to the district heating system and the system for district cooling. During connection of the flexible conduits to the district heating network and the network for district cooling, at least one cut-off valve is preferably used with which a shutdown of each respective flexible conduit may be performed.

Storage of the flexible conduits may be accomplished via a reeling device when not in use. In alternative embodiments, the storage of the flexible conduits may be accomplished in another for the purpose suitable manner when not in use. For example, the flexible conduit may be stored in an unconnected manner to the climate control system in an external space.

Preferably, the climate control system includes at least one connection to the electricity mains (outlet). This may be accomplished via an electrical cord 44 or the like. In the exemplifying embodiment, the design includes at least one reeling device 45 for the cord.

In alternative embodiments of the present climate control system, it is made of at least two and preferably several modules. For example, one module may consist of a conditioning device of the air that is, a cooling package, a heating package or a combined heating and cooling package. It is further conceivable that the various types of filters consist of one or more modules. By using a modular design, a filter module, or filter modules, may be selected which corresponds to the specific application requirements. It is further conceivable that the filter module or filter modules be adapted to the prevailing season (variations in temperature, etc.).

The idea behind the modular design is that the air handling unit should be able to be used both as suspended on a boarding bridge 7 and even connected to a cart (wagon) 8 or similar. A module may thus be of a suitable design so that the air handling unit may be suspended on a boarding bridge. Another module consists of a wheel application, with or without a drive unit, which is connected to the air handling unit so that it may be moved on the ground.

Additional modules include connectors for the district heating network and the district cooling network. The design may also include at least one module comprised of connectors for the aircraft ventilation systems such as supply and exhaust air. In alternative embodiments, the modules may also include modules for ground warming (melting of snow and ice), and for treatment of air supplied to the boarding bridge.

In the detailed description of the present invention, design details may have been omitted which are apparent to professionals in the field of the invention. Such obvious design details are included to the extent necessary so that the proper and full performance of the present device and method is achieved.

Even if certain preferred embodiments have been described in detail, variations and modifications of the method and design may become apparent for specialists in the field of the invention. All such modifications and variants are regarded as falling within the scope of the following claims.

In alternative embodiments, the climate control system includes a function with which air humidity (moisture) in the handled air emitted from the climate control system that is supplied to the aircraft cabin may be regulated. In an alternative embodiment, the supply of power to the climate control system may be accomplished by another for the purpose suitable technique. For example, it is possible that the supply of energy is accomplished via another suitable for the purpose conduit, hose, tube or the like. It is thus conceivable that the energy supplied to the system is generated via hybrid assembly (including an internal combustion engine, a generator and batteries) solar panels, small wind turbines or other energy source suitable for the purpose. It is further conceivable that the present climate control system may be defined as a system and/or method for its use during the further processing of the present patent application.

ADVANTAGES OF THE INVENTION

Several advantages are achieved with the present invention. The most obvious advantage is that a system which eliminates or reduces at least one of said technical problems is obtained. Another advantage is that a climate control system for aircraft is obtained which is essentially intended to be powered by energy from district heating, which is advantageous from an environmental perspective. Another advantage of the present invention is that it may be used both to cool and heat the aircraft cabin. A further advantage of the present invention is that the device's cooling unit may be connected to a system for district cooling. It is a further advantage that the present device may be part of a system used for example to heat/cool the spaces of the so-called boarding bridge. A further advantage of the present system is that it may be used to warm the ground for melting snow and ice adjacent the position of parked aircraft.

The invention claimed is:

1. A modular climate control system for temporary connection to an aircraft standing on the ground, the system comprising:
    an air handling unit;
    a mobile transfer device;
    the air handling unit connected to the mobile transfer device;
    the air handling unit comprising:
        a heating and cooling package configured to alternatively cool and heat air passing through the air handling unit,
        a supply duct configured to supply air from the air handling unit to an aircraft,
        a exhaust duct configured to return air from an aircraft to the air handling unit, and
        a fluid supply conduit connected to the heating and cooling package to provide cooling or heating fluid to the heating and cooling package; and
    a first and a second heat exchanger located apart from the air handler;
    a closed-loop circuit connected to communicate fluid between both the first and second heat exchangers and the fluid supply conduit;
    the first and second heat exchanger enabled to, alternatively, provide cooling and heating to the closed-loop conduit.

2. The modular climate control system in accordance with claim 1 and wherein the exhaust duct is connected to the aircraft.

3. The modular climate control system in accordance with claim 1 and further comprising:
    a cooling network connected to and supplying cooling liquid to the first heat exchanger; and
    a heating network connected to and supplying heating liquid to the second heat exchanger.

* * * * *